(12) United States Patent
Mekid et al.

(10) Patent No.: US 8,596,134 B2
(45) Date of Patent: Dec. 3, 2013

(54) BOLT TENSION MONITORING SYSTEM

(75) Inventors: Samir Mekid, Dhahran (SA); Abdelhafid Bouhraoua, Dhahran (SA)

(73) Assignees: King Fahd University of Petroleum and Minerals, Dhahran (SA); King Abdulaziz City for Science and Technology, Riyadh (SA)

( * ) Notice: Subject to any disclaimer, the term of this patent is extended or adjusted under 35 U.S.C. 154(b) by 153 days.

(21) Appl. No.: 13/239,040

(22) Filed: Sep. 21, 2011

(65) Prior Publication Data

US 2013/0068031 A1   Mar. 21, 2013

(51) Int. Cl.
*F16B 31/02* (2006.01)
*G01B 5/30* (2006.01)
*G01B 7/16* (2006.01)
*G01L 1/00* (2006.01)
*G01N 3/00* (2006.01)

(52) U.S. Cl.
USPC .............................................. 73/761; 73/760

(58) Field of Classification Search
USPC .................................................. 73/761, 760
See application file for complete search history.

(56) References Cited

U.S. PATENT DOCUMENTS

| | | | |
|---|---|---|---|
| 3,561,260 A * | 2/1971 | Reynolds ........................ | 73/761 |
| 4,773,272 A * | 9/1988 | Trungold ........................ | 73/761 |
| 5,569,866 A * | 10/1996 | Allison .................... | 73/862.626 |
| 6,204,771 B1 | 3/2001 | Ceney | |
| 6,250,863 B1 * | 6/2001 | Kamentser et al. ............. | 411/10 |
| 6,791,465 B2 | 9/2004 | Blagin et al. | |
| 7,412,898 B1 | 8/2008 | Smith et al. | |
| 7,698,949 B2 | 4/2010 | Akdeniz et al. | |
| 7,762,142 B2 | 7/2010 | Rakow et al. | |
| 8,024,980 B2 * | 9/2011 | Arms et al. ..................... | 73/763 |
| 8,096,194 B2 * | 1/2012 | Chiapuzzi .................. | 73/862.21 |
| 8,156,820 B2 * | 4/2012 | Dral et al. ........................ | 73/761 |
| 8,391,561 B2 * | 3/2013 | Takman et al. ............... | 382/108 |
| 8,448,520 B1 * | 5/2013 | Baroudi et al. .................. | 73/761 |
| 2002/0044063 A1 * | 4/2002 | Blagin et al. .................. | 340/665 |
| 2003/0051556 A1 * | 3/2003 | Clarke ............................ | 73/761 |
| 2003/0145657 A1 * | 8/2003 | Engler et al. .................... | 73/761 |
| 2011/0181393 A1 * | 7/2011 | Tillotson et al. ............. | 340/10.1 |
| 2012/0198941 A1 * | 8/2012 | Smith .............................. | 73/761 |
| 2013/0064622 A1 * | 3/2013 | Mekid et al. .................... | 411/13 |
| 2013/0068031 A1 * | 3/2013 | Mekid et al. .................... | 73/761 |

FOREIGN PATENT DOCUMENTS

| | | |
|---|---|---|
| JP | 2005-121132 | 5/2005 |
| WO | WO 2004040151 A1 | 5/2004 |
| WO | WO 2007089759 A2 | 8/2007 |

* cited by examiner

*Primary Examiner* — Lisa Caputo
*Assistant Examiner* — Jamel Williams
(74) *Attorney, Agent, or Firm* — Richard C. Litman

(57) ABSTRACT

The bolt tension monitoring system provides remote monitoring of the tension of a bolt, thus allowing for remote monitoring of general structural health and integrity of the fastener. The bolt tension monitoring system includes a housing adapted for being retained on a head of a bolt to be monitored. The system further includes a force transducer positioned between the head of the bolt and a surface in which the bolt is fastened and measures tension between the head of the bolt and the workpiece surface. A controller circuit within the housing calculates the difference between currently measured tension between the head of the bolt and the workpiece surface and an initially measured tension. A wireless transponder mounted in the housing transmits an alert signal if the calculated difference exceeds a pre-defined threshold value.

20 Claims, 3 Drawing Sheets

BOLT TENSION MONITORING SYSTEM

BACKGROUND OF THE INVENTION

1. Field of the Invention

The present invention relates to mechanical fasteners and to electronic sensors for detecting failure of mechanical components, and particularly to a bolt tension monitoring system for transmitting alert signals when a measured tension differential of a particular bolt exceeds a pre-defined threshold value.

2. Description of the Related Art

Bolted joints are found in a wide range of structures and machines, and improperly tightened bolts, or loosened bolts, may severely compromise the safety and structural integrity of a joint. Insufficient pre-loading tension is a common cause of bolted joint failure. Similarly, due to the stresses a structure or machine undergoes in its lifetime, bolts can easily become loosened over time. Insufficient tension in the bolt, even if it was properly tightened at the time of construction, can also cause joint failure.

Given that most structures and machines use hundreds or thousands of bolts in their construction, it is impractical to regularly manually test the tension of each bolt. Bolts are often hidden from view or are otherwise inaccessible once a structure or machine is fully constructed. Thus, it would be desirable to provide a remote monitoring system that can measure the tension in a bolt, throughout its lifetime, and also provide accurate identification and location information for that bolt if a loss of tension is detected.

Thus, a bolt tension monitoring system solving the aforementioned problems is desired.

SUMMARY OF THE INVENTION

The bolt tension monitoring system provides remote monitoring of the tension of a bolt, thus allowing for remote monitoring of general structural health and integrity. The bolt tension monitoring system includes a housing or cap having opposed upper and lower ends, the lower end defining a recess adapted for receiving the outer face of a head of a bolt to be monitored. The system further includes a force transducer having opposed upper and lower faces, the head of the bolt bearing against the upper face the transducer. The force transducer is positioned between the head of the bolt and a surface in which the shaft of the bolt is fastened, and measures tension between the head of the bolt and the surface.

A circuit disposed within the housing calculates the difference between the currently measured tension between the head of the bolt and the surface and the initially measured tension. A wireless transponder mounted in the housing transmits an alert signal if the calculated difference exceeds a pre-defined threshold value. A radio frequency identification tag is further mounted in the housing and is in communication with the wireless transponder. The radio frequency identification tag has identification information associated with the bolt stored therein, and the alert signal also includes the identification information.

These and other features of the present invention will become readily apparent upon further review of the following specification and drawings.

BRIEF DESCRIPTION OF THE DRAWINGS

Similar reference characters denote corresponding features consistently throughout the attached drawings.

DETAILED DESCRIPTION OF THE PREFERRED EMBODIMENTS

Figure 1:
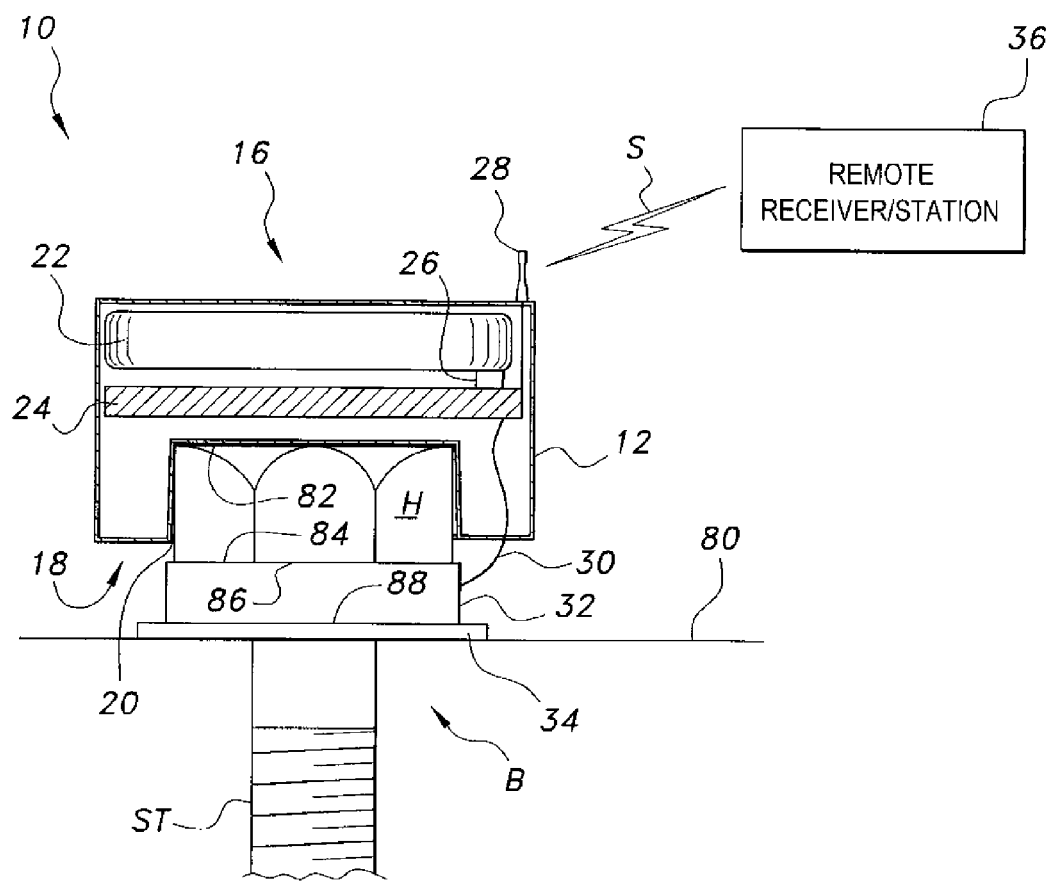
FIG. 1 is an environmental, side view of a bolt tension monitoring system according to the present invention, the housing or cap and the printed circuit board housed therein being shown in section.

The bolt tension monitoring system 10 provides remote monitoring of the tension of a bolt B, thus allowing for remote monitoring of general structural health and integrity of the fastener. The bolt tension monitoring system 10 includes a cap or housing 12 having opposed upper and lower ends 16, 18, respectively, the lower end 18 defining a recess 20 adapted for receiving the outer face 82 of a head H of a bolt B to be monitored. Preferably, the head H of the bolt B is snugly received within the recess 20. It should be understood that the housing 12 may be dimensioned and configured to form a snap fit or pressure fit with the size and shape of the particular type of bolt B to which the housing 12 is applied.

The system 10 further includes a force transducer 32 having opposed upper and lower faces 86, 88, respectively, the head H of the bolt B having an inner or lower face bearing against the transducer 32 when the bolt B is fastened to a workpiece. The force transducer 32 is positioned between the head H of bolt B and the surface 80 of the workpiece in which the bolt B is embedded and measures tension between the head H and the surface 80. The force transducer 32 is preferably annular, having a central aperture or opening thereof receiving the shaft ST of the bolt B. A washer 34 is may be provided, the lower face 88 of the force transducer 32 contacting the washer 34, which is positioned between the lower face 88 and the workpiece surface 80. The shaft ST of the bolt B passes through the central opening of the washer 34.

The cap or housing is hollow, and a printed circuit board (PCB) bearing a controller circuit 24 is disposed within the housing 12. The controller circuit 24 is configured for calculating the difference between the currently measured tension between the head H of bolt B and the surface 80 and an initially measured tension. The controller circuit 24 may include any suitable type of controller, such as a microprocessor, a programmable logic controller or the like. A wireless transponder 40, which may also be mounted on the PCB in the housing 12, transmits an alert signal S if the calculated difference exceeds a pre-defined threshold value. An antenna 28 is preferably mounted on the cap or housing 12 and is in communication with the controller circuit 24 and transponder the 40 via a wire connection.

It should be understood that the wireless transponder 40 may be any suitable type of wireless transponder, and may be provided as a separate component or integrated into the controller circuit 24. The wireless transponder 40 may be a Zig-Bee® transponder, for example. A radio frequency identification tag (RFID) 50 is also mounted in the housing 12 and is in communication with the wireless transponder 40. The radio frequency identification tag has identification information associated with the bolt stored therein, so that the alert signal S also includes the identification information from the RFID tag.

The initially measured tension may be stored in memory 90, which may be any suitable type of computer readable storage medium, or a desired initial tension may be recorded in the RFID tag 50. The RFID tag 50 preferably includes a particular identifier associated with a particular bolt, location information for the bolt (included in the transmitted identification information) and, as noted above, may also include the desired initial tension. A battery 22 is preferably provided within housing 12 for powering the controller circuit 24 and connected with the controller circuit 24 by a spacer having internal wiring, the battery also providing power for the transponder 40 and other system components. It should be understood that any suitable type of power source may be utilized. For example, power harvesting from ambient radio signals, solar power or any other suitable type of power supply may be used in combination with, or to replace, the battery 22.

As shown in FIG. 1, the force transducer 32 communicates with the controller circuit 24 via a wired connection 30. The transducer 32 may be any suitable type of force, tension or torque transducer. The transducer 32 is preferably a relatively low-voltage transducer with calibrated readings on the order of a few Volts. Such transducers are well known in the art and commercially available, and need not be described further. Torque that is applied to the bolt B is measured as tension between the bolt head H and the workpiece surface 80. This tension must be maintained at a constant level for structural safety and integrity.

Figure 3:
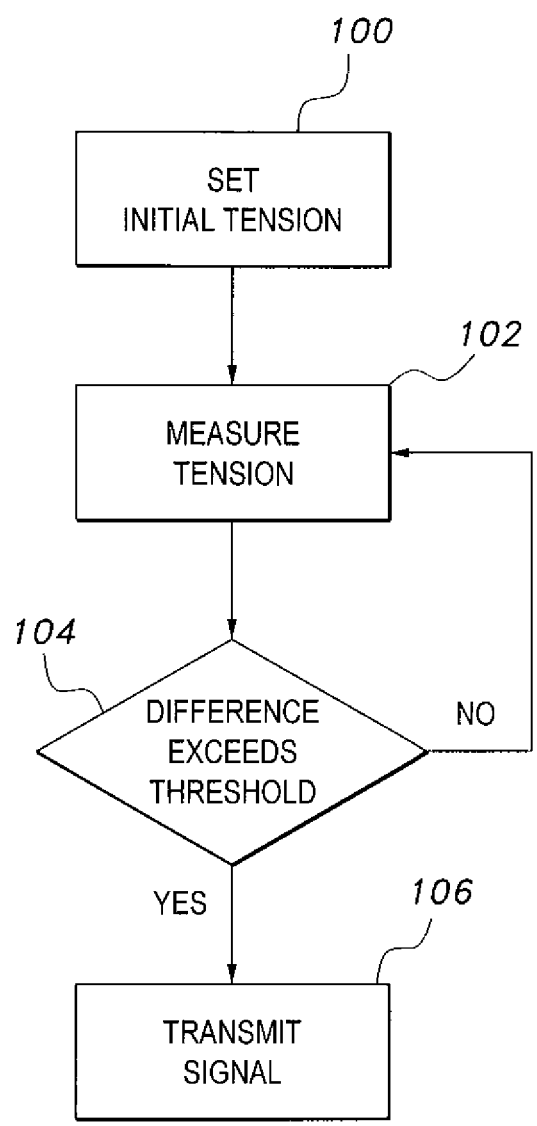
FIG. 3 is a flowchart illustrating operation of a bolt tension monitoring system according to the present invention.

As shown in FIG. 3, the initially measured tension (set at the time of bolt-tightening) occurs in step 100 and is recorded in memory 90. Alternatively, the RFID tag 50 may have a desired initial tension stored therein. The transducer 32 measures the current tension, either continuously or at regular intervals, as indicated in step 102. The controller circuit 24 calculates the difference between the currently measured tension and the stored initial tension. At step 104, the controller circuit 24 determines if the calculated difference exceeds a pre-defined threshold. If not, then the flow returns to step 102, and the system 10 continues to monitor the tension, either continuously or at regular intervals. If the difference exceeds the pre-defined tension, then the flow proceeds to step 106, at which point the wireless transponder 40 transmits an alert signal S to a remote monitoring station 36. As noted above, the alert signal S includes identification information regarding the particular bolt, including the bolt's location, so that appropriate repair and maintenance can be performed by responding personnel.

Figure 2:
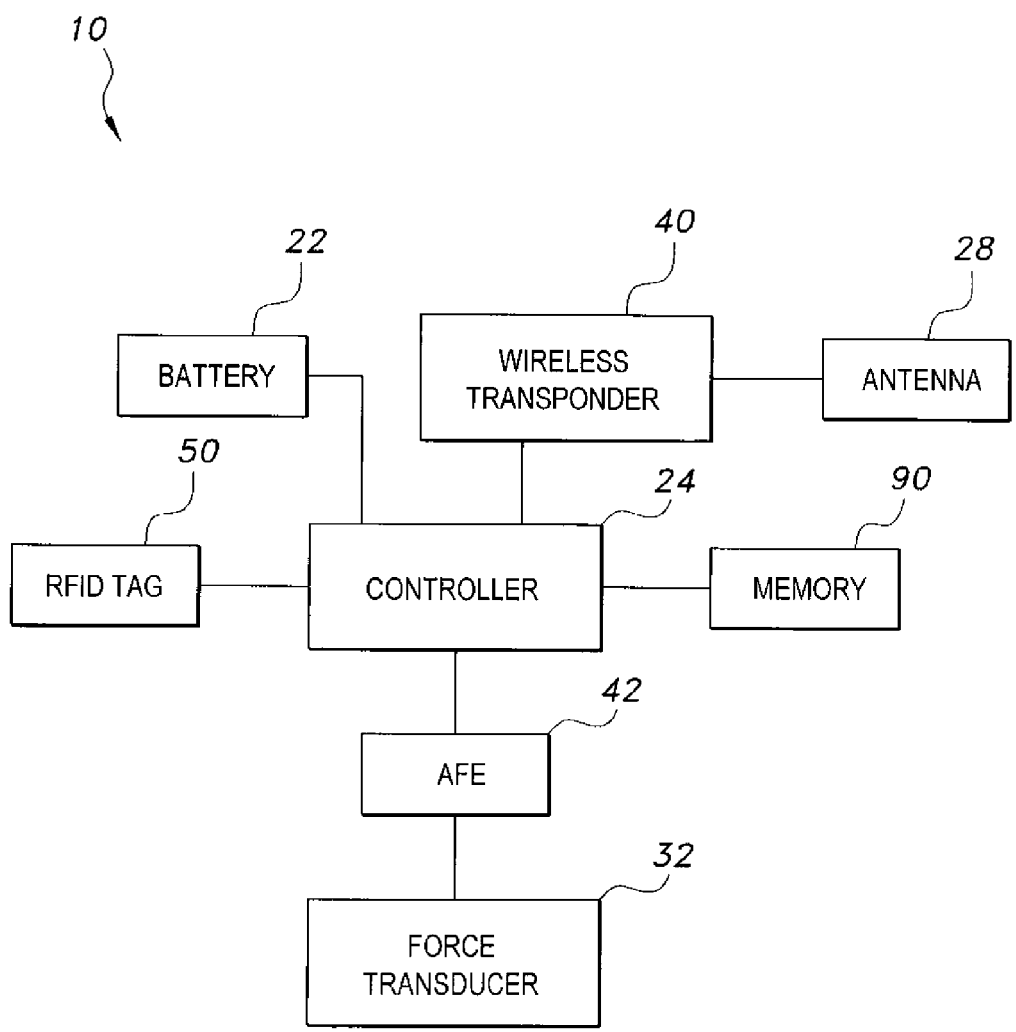
FIG. 2 is a block diagram illustrating system components of a bolt tension monitoring system according to the present invention.

As shown in FIG. 2, an analog front-end (AFE) circuit 42 is also preferably provided for conditioning the signal generated by the force transducer 32 prior to measurement and analysis by the controller circuit 24. The AFE circuit 42 may be a stand-alone conditioning circuit, or may be integrated into the controller circuit 24. Additionally, it should be understood that power-saving circuitry or programming may be utilized, allowing the system 10 to enter a power saving or "sleep" mode when not in use. Further, the AFE circuit 42 preferably communicates with at least one analog-to-digital converter for converting analog signals generated by the transducer 32 into digital data for processing by the controller circuit 24. The analog-to-digital converter may be integrated into the controller circuit 24, or into the transducer 32.

In addition to measuring force or tension of the bolt B, it should be understood that additional types of sensors may be integrated into the system 10. For example, local temperature and/or humidity sensors may also provide environmental condition information to be transmitted in signal S. Further, the controller circuit 24 may be programmed to monitor tension continuously or at pre-set intervals, or the wireless transponder 40 may be used to receive an actuation signal from the remote station 36 so that monitoring only occurs when an actuation signal is received by the wireless transponder 40.

It is to be understood that the present invention is not limited to the embodiments described above, but encompasses any and all embodiments within the scope of the following claims.

We claim:

1. A bolt tension monitoring system, comprising:
a hollow housing having opposed upper and lower ends, the lower end defining a recess adapted for being retained on a head of a bolt;
a force transducer having opposed upper and lower faces, the upper face being adapted for providing a bearing surface for the head of the bolt, the force transducer being positioned between the head of the bolt and a workpiece surface in which the bolt is fastened, the force transducer converting tension between the head of the bolt and the workpiece surface into a calibrated voltage, wherein the tension is continuously measured by the force transducer;
a controller circuit electrically connected to the force transducer for calculating a difference between the calibrated voltage corresponding to currently measured tension between the head of the bolt and the workpiece surface and the calibrated voltage corresponding to an initial tension measured when the bolt is installed in the workpiece; and
a transponder circuit for automatically transmitting an alert signal when the difference exceeds a pre-defined threshold value, the transponder circuit being electrically connected to the controller circuit and mounted in the housing.

2. The bolt tension monitoring system as recited in claim 1, wherein said force transducer is annular, having a central opening formed therethrough adapted for receiving a shaft of the bolt.

3. The bolt tension monitoring system as recited in claim 2, further comprising a washer positioned between the lower face of said force transducer and the workpiece surface.

4. The bolt tension monitoring system as recited in claim 1, further comprising a battery mounted in the housing, the battery being electrically connected to the controller circuit.

5. The bolt tension monitoring system as recited in claim 1, wherein said transponder circuit comprises a wireless transponder.

6. The bolt tension monitoring system as recited in claim 5, wherein said transponder circuit further comprises an antenna mounted on said housing.

7. The bolt tension monitoring system as recited in claim 6, further comprising a radio frequency identification tag disposed in the housing and connected to said transponder circuit.

8. The bolt tension monitoring system as recited in claim 7, wherein the alert signal includes identification information associated with the bolt stored on the radio frequency identification tag.

9. The bolt tension monitoring system as recited in claim 8, wherein the identification information includes location information.

10. A bolt tension monitoring system, comprising:
a hollow housing having opposed upper and lower ends, the lower end defining a recess adapted for being retained on a head of a bolt;
a force transducer having opposed upper and lower faces, the upper face being adapted for providing a bearing surface for the head of the bolt, the force transducer being positioned between the head of the bolt and a workpiece surface in which the bolt is fastened, the force transducer converting tension between the head of the bolt and the workpiece surface into a calibrated voltage, wherein the tension is continuously measured by the force transducer;

a controller circuit electrically connected to the force transducer for calculating a difference between the calibrated voltage corresponding to currently measured tension between the head of the bolt and the workpiece surface and the calibrated voltage corresponding to an initial tension measured when the bolt is installed in the workpiece; and a wireless transponder circuit for automatically transmitting an alert signal when the difference exceeds a predefined threshold value, the transponder circuit being electrically connected to the controller circuit and mounted in the housing.

11. The bolt tension monitoring system as recited in claim 10, wherein said force transducer is annular, having a central opening formed therethrough adapted for receiving a shaft of the bolt.

12. The bolt tension monitoring system as recited in claim 11, further comprising a washer positioned between the lower face of said force transducer and the workpiece surface.

13. The bolt tension monitoring system as recited in claim 10, further comprising a battery mounted in the housing, the battery being electrically connected to the controller circuit.

14. The bolt tension monitoring system as recited in claim 10, wherein said wireless transponder circuit further comprises an antenna mounted on said housing.

15. The bolt tension monitoring system as recited in claim 14, further comprising a radio frequency identification tag disposed in the housing and connected to said wireless transponder circuit.

16. The bolt tension monitoring system as recited in claim 15, wherein the alert signal includes identification information associated with the bolt stored on the radio frequency identification tag.

17. The bolt tension monitoring system as recited in claim 16, wherein the identification information includes location information.

18. A bolt tension monitoring system, comprising:

a hollow housing having opposed upper and lower ends, the lower end defining a recess adapted for being retained on a head of a bolt;

a force transducer having opposed upper and lower faces, the upper face being adapted for providing a bearing surface for the head of the bolt, the force transducer being positioned between the head of the bolt and a workpiece surface in which the bolt is fastened, the force transducer converting tension between the head of the bolt and the workpiece surface into a calibrated voltage, wherein the tension is measured by the force transducer at regular time intervals;

a controller circuit electrically connected to the force transducer for calculating a difference between the calibrated voltage corresponding to currently measured tension between the head of the bolt and the workpiece surface and the calibrated voltage corresponding to an initial tension measured when the bolt is installed in the workpiece;

a wireless transponder circuit for automatically transmitting an alert signal when the difference exceeds a predefined threshold value, the transponder circuit being electrically connected to the controller circuit and mounted in the housing; and a radio frequency identification tag electrically connected to the wireless transponder circuit and housed within the housing, the radio frequency identification tag having identification information associated with the bolt stored therein, the alert signal including the identification information.

19. The bolt tension monitoring system as recited in claim 18, wherein said transponder circuit further comprises an antenna mounted on said housing.

20. The bolt tension monitoring system as recited in claim 19, wherein the identification information includes location information.

* * * * *